Patented Oct. 28, 1930

1,779,744

UNITED STATES PATENT OFFICE

GASPARD JAKOVA-MERTURI, OF GAGNY, FRANCE, ASSIGNOR TO SOCIETE LA CARBONISATION, SOCIETE GENERALE D'EXPLOITATION DES CARBONES, OF PARIS, FRANCE

METALLURGICAL FUEL AND PROCESS FOR MAKING THE SAME

No Drawing. Application filed April 4, 1928, Serial No. 267,475, and in France April 11, 1927.

The object of my invention is to provide, as an article of manufacture, a metallurgical fuel, that is to say a fuel adapted to be used in and for all and any metallurgical operations carried out in industrial practice and especially for transforming cast or crude or pig iron into steel or into iron.

My invention also covers the process for making such a fuel.

According to the invention the process consists essentially in calcining or charring wood in the apparatus usually employed for this kind of operation, while taking care, however, to avoid any distilling of the wood.

At the beginning of the operation I heat the wood slowly in order to remove all moisture. Once the product is dried, I close the apparatus, without hermetic tightness being necessary, and I gradually heat up to a temperature between 200° and 250° C. In such conditions, there is obtained a charcoal the colour of which ranges from light brown to dark brown (reddish).

The degree of temperature varies according as hard wood or soft wood is to be treated. The operation would seem to give best results, however, when hard wood (oak, beech, etc.) is used.

I separately prepare a hot solution of nitrate of soda, or another nitrate or of an alkaline borate, or of a mixture of these. Said solution may be made with any proportions and the proportions may be varied according to the nature of the nitrate used and according to the purpose of the reduction intended to be effected.

I inject the hot azotate solution upon the still hot charcoal by means of suitable sprayers and continue heating until the whole of the water is completely evaporated.

Reddish or brown charcoal possesses a high power of adsorbing nitrate of soda, and once the water of the solution has been evaporated, there remains brown charcoal impregnated with nitrate of soda or other nitrate.

I withdraw the charcoal so treated and pulverize the same by hot crushing: it is this charcoal powder that will serve later on for metallurgical treatments.

Instead of employing charred charcoal as above described, I might treat with a nitrate, and especially with nitrate of soda, any other kind of coal calcined to any degree, as, for instance, charcoal from natural incomplete wood decomposition, for example, lignites.

The best results would seem to be obtainable, however, by using the reddish charcoal above referred to, due to its richness in volatile gases, and, especially in hydrogen, this constituting a first class reducer for carbon, phosphorus and sulphur.

Instead of treating the fuel with a nitrate solution, the nitrate may be incorporated into the fuel by crushing simultaneously the two substances.

If it is desired to transform lignites or even peat coal or other coals, coked or not, into metallurgical fuel offering properties comparable to those of the reddish charcoal above referred to, those bodies are pounded into small lumps or bits (2 or 3 mm. in size, for instance) and are immersed in a solution containing about 1 to 2% of caustic soda (or potash) for about 2 or 3 hours, these numerical data being variable according to the sulphur grade of the lignites or of the peat or other coals employed. I then remove the tiny bits from the bath and put them in retorts wherein they are distilled. The distilling may be effected, for example, in a blast of deoxidized air and steam so as to remove the tar, preferably, however, without the products being permitted to get coked.

In this state or condition the said bits keep their structure without any distortion. In the case of lignites having a high sulphur content, the sulphur reduced to the state of soluble sulphate is removed by successive washings.

After centrifuging the material, and while it is still damp, I incorporate thereinto, by kneading nitrate of soda or other nitrates such as: calcium, barium, strontium, potassium, etc. . . . or a mixture of such bodies, and I let it dry. As an example and for cast iron containing about 1 to 2% of sulphur and from 2 to 3% of phosphorous, the proportions of nitrate or equivalent bodies with respect to lignite should be as follows, in weight:

|  | Parts |
|---|---|
| Nitrate or equivalent body | from 5 to 6 |
| Lignite | from 95 to 94 |
|  | 100   100 |

The product is then ready for use.

Instead of nitrates, I may, of course, incorporate caustic soda or caustic potash, or else a mixture of soda or of potash with a nitrate, or again I may replace the nitrates by borates or by a mixture thereof, and this in any proportions suitable for the percent of sulphur and of phosphorus contained in the crude or cast iron to be treated.

This fuel, mixed with or having absorbed the nitrate, possesses the property of decarburating, desulphurating, and dephosphorizing cast iron as well as copper and the other non-volatile metals. There is no difficulty in obtaining the reaction that takes place owing to the oxidation of the carbon which escapes as carbonic acid while phosphorus and sulphur are eliminated as phosphorized and sulphuretted hydrogen.

Where it is a case of directly decarburating cast iron as it comes from the blast furnace in order to obtain steel with a predetermined carbon grade, or to obtain iron, I proceed as follows:

The mixture of pulverized coal and nitrate, by whatever method obtained, is injected by means of sprayers upon the cast iron as the latter comes down into the crucible or throat of the blast furnace, and a hot hydrogen and air blast is blown thereagainst at the same time, if thought necessary.

In order to carry out this operation, I may utilize a turning and tilting sole or a sloping sole of adequate length wherealong the molten cast iron is treated by means of the above mentioned injections. If it is desired not to make any alteration in the blast furnace, the cast may be made to run down into a converter wherein it will undergo the same treatment, said cast iron being kept molten in the converter by any suitable heating means. I stop the operation when a sample testing shows that the desired degree of decarburation is reached, but the operation can be carried on until almost pure iron is obtained. Steel thus obtained possesses the qualities of the very best grades.

The soles or even the walls of the converter may advantageously be revetted with a lining made of the material that is the object of this invention. The hydrogen blast above referred to is valuable chiefly where pure iron or steels holding very little carbon in combination are desired to be obtained.

My process, while very economical, permits the treatment of any grade of cast iron and even alloys of all kinds producing pure iron or cast steel very pure and holding any desired amount of carbon.

I claim as my invention:

1. In a method of transforming cast iron into steel or iron, the steps of heating a fibrous carbonaceous material to a point short of complete decomposition; impregnating the resultant product with a solution of an alkaline salt; pulverizing the impregnated material; and injecting the pulverized material upon the cast iron as the latter comes from the blast furnace, thereby desulphurizing and dephosphorizing it.

2. In a method of transforming cast iron into steel or iron, the steps of heating wood to a point short of complete decomposition; impregnating the resultant product with a nitrate solution; pulverizing the impregnated material; and injecting the pulverized material upon the cast iron as the latter comes from the blast furnace, thereby desulphurizing and dephosphorizing it.

3. In a method of transforming cast iron into steel or iron, the steps of impregnating wood charcoal in a heated state with a nitrate solution; pulverizing the impregnated charcoal; and injecting the pulverized material upon the cast iron as the latter comes from the blast furnace, thereby desulphurizing and dephosphorizing it.

4. In a method of transforming cast iron into steel or iron, the steps of impregnating wood charcoal in a heated state with a sodium nitrate solution; pulverizing the impregnated charcoal; and injecting the pulverized material upon the cast iron as the latter comes from the blast furnace, thereby desulphurizing and dephosphorizing it.

5. A method according to claim 2, in which a blast of hot air and hydrogen is directed against the cast iron simultaneously with the injection of the pulverized material thereagainst.

6. A method according to claim 3, in which a blast of hot air and hydrogen is directed against the cast iron simultaneously with the injection of the pulverized nitrate-impregnated charcoal thereagainst.

In testimony whereof I affix my signature.

GASPARD JAKOVA-MERTURI.